(12) United States Patent
Kim

(10) Patent No.: US 10,715,775 B2
(45) Date of Patent: Jul. 14, 2020

(54) MULTIMEDIA DEVICE FOR PROCESSING VIDEO SIGNAL AND CONTROL METHOD THEREOF

(71) Applicant: LG ELECTRONICS INC., Seoul (KR)

(72) Inventor: Kyuri Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/246,294

(22) Filed: Jan. 11, 2019

(65) Prior Publication Data

US 2019/0313072 A1 Oct. 10, 2019

(51) Int. Cl.
*H04N 9/77* (2006.01)
*H04N 9/68* (2006.01)
(Continued)

(52) U.S. Cl.
CPC .............. *H04N 9/77* (2013.01); *G06T 5/008* (2013.01); *G06T 5/009* (2013.01); *H04N 9/643* (2013.01);
(Continued)

(58) Field of Classification Search
CPC . H04N 9/77; H04N 9/643; H04N 9/68; G06T 5/008; G06T 5/009;
(Continued)

(56) References Cited

U.S. PATENT DOCUMENTS 8,363,131 B2 1/2013 Lin
8,553,152 B2 * 10/2013 Yoon .................. H04N 21/4431
348/600

(Continued)

FOREIGN PATENT DOCUMENTS

WO 2016098992 6/2016

OTHER PUBLICATIONS

PCT International Application No. PCT/KR2018/014351, Notification of Transmittal of the International Search Report and the Written Opinion of the International Searching Authority, or Declaration dated Mar. 5, 2019, 11 pages.

*Primary Examiner* — Brian P Yenke
(74) *Attorney, Agent, or Firm* — Lee, Hong, Degerman, Kang & Waimey

(57) ABSTRACT

The present invention discloses a multimedia device for processing a video signal and control method thereof. According to an embodiment of the present invention, the multimedia device includes a controller configured to perform tone mapping, a dynamic contrast function, and a local contrast function. The controller performs the tone mapping not only on an HDR video signal but also on an SDR video signal. When performing the tone mapping on the SDR video signal, the controller amplifies only an intermediate-gradient region without adjusting low-gradient and high-gradient regions. When performing the dynamic contrast function, the controller only an intermediate-gradient region of the video signal without adjusting low-gradient and high-gradient regions. When performing the local contrast function, the controller divides the video signal into blocks, calculates an APL value of each block, and then applies a linear curve based on the APL value.

12 Claims, 15 Drawing Sheets

(51) Int. Cl.
*H04N 9/64* (2006.01)
*G06T 5/00* (2006.01)

(52) U.S. Cl.
CPC ..... *H04N 9/68* (2013.01); *G06T 2207/10016* (2013.01); *G06T 2207/20021* (2013.01); *G06T 2207/20208* (2013.01)

(58) Field of Classification Search
CPC . G06T 2207/10016; G06T 2207/20021; G06T 2207/20208
See application file for complete search history.

(56) References Cited

U.S. PATENT DOCUMENTS

| | | | | |
|---|---|---|---|---|
| 9,501,855 | B2* | 11/2016 | Aiba | G09G 5/14 |
| 9,606,638 | B2* | 3/2017 | Chung | H04N 5/44513 |
| 9,665,964 | B2* | 5/2017 | Aiba | G09G 5/14 |
| 9,788,042 | B2* | 10/2017 | Ro | H05B 33/0863 |
| 10,032,300 | B2* | 7/2018 | Aiba | G09G 5/377 |
| 10,051,319 | B2* | 8/2018 | Nishi | G06T 5/009 |
| 10,176,561 | B2* | 1/2019 | Evans | H04N 9/646 |
| 10,218,952 | B2* | 2/2019 | Wozniak | H04N 7/147 |
| 10,313,743 | B2* | 6/2019 | Kozuka | H04N 21/4325 |
| 10,360,875 | B2* | 7/2019 | Kang | G09G 5/10 |
| 10,362,286 | B2* | 7/2019 | Toma | H04N 9/77 |
| 10,402,681 | B2* | 9/2019 | Aiba | G06K 9/6202 |
| 2011/0273540 | A1* | 11/2011 | Lee | G06F 3/0346 348/51 |
| 2012/0044277 | A1* | 2/2012 | Adachi | G09G 3/3426 345/690 |
| 2012/0050267 | A1* | 3/2012 | Seo | H04N 21/422 345/419 |
| 2012/0176543 | A1* | 7/2012 | Jeong | G06F 3/0482 348/563 |
| 2012/0176546 | A1* | 7/2012 | Yoon | H04N 21/4431 348/600 |
| 2014/0002479 | A1* | 1/2014 | Muijs | G06T 5/50 345/589 |
| 2014/0210847 | A1* | 7/2014 | Knibbeler | G09G 5/006 345/589 |
| 2015/0170389 | A1* | 6/2015 | Ming | G06K 9/00684 382/284 |
| 2015/0201109 | A1 | 7/2015 | Li | |
| 2016/0066011 | A1* | 3/2016 | Ro | G06F 3/017 725/38 |
| 2016/0381398 | A1* | 12/2016 | Saxena | H04N 21/2353 348/39 |
| 2017/0018109 | A1* | 1/2017 | Aiba | G09G 5/14 |
| 2017/0103729 | A1* | 4/2017 | Huang | G06T 5/20 |
| 2017/0228908 | A1* | 8/2017 | Aiba | G09G 5/14 |
| 2017/0256039 | A1* | 9/2017 | Hsu | G06T 5/009 |
| 2017/0353704 | A1* | 12/2017 | Su | H04N 9/646 |
| 2018/0007356 | A1 | 1/2018 | Kadu et al. | |
| 2018/0082661 | A1 | 3/2018 | Kang et al. | |
| 2018/0130188 | A1* | 5/2018 | Farrell | G06T 5/007 |
| 2018/0152686 | A1* | 5/2018 | Wozniak | H04N 7/15 |
| 2018/0204542 | A1* | 7/2018 | Saito | G09G 5/14 |
| 2018/0232867 | A1* | 8/2018 | Park | G06T 5/00 |
| 2018/0242006 | A1* | 8/2018 | Kerofsky | H04N 19/70 |
| 2018/0300921 | A1* | 10/2018 | Aiba | G09G 5/14 |
| 2018/0330674 | A1* | 11/2018 | Baar | G06T 5/009 |
| 2019/0132643 | A1* | 5/2019 | Walls | H04N 21/440218 |
| 2019/0206032 | A1* | 7/2019 | Yip | H04N 5/235 |

* cited by examiner

Conventional Method

FIG. 10c

| Percentage of APL | Degree of slope |
|---|---|
| 0%~16% | 30° |
| 17%~33% | 36° |
| 34%~50% | 42° |
| 51%~66% | 48° |
| 66%~85% | 54° |
| 86%~100% | 60° |

MULTIMEDIA DEVICE FOR PROCESSING VIDEO SIGNAL AND CONTROL METHOD THEREOF

Pursuant to 35 U.S.C. § 119(a), this application claims the benefit of earlier filing date and right of priority to Korean Application No. 10-2018-0041549, filed on Apr. 10, 2018, the contents of which are hereby incorporated by reference herein in its entirety.

BACKGROUND OF THE INVENTION

Field of the Invention

The present invention relates to a multimedia device for processing video signals and control method thereof. The multimedia device may include, for example, a television (TV), a set top box (STB), and the like. In addition, the present invention can be applied to other types of video signal processing devices.

Discussion of the Related Art

The high dynamic range (HDR) video signal has a wider dynamic range than that of the conventional standard dynamic range (SDR) video signal to give a person a feeling of looking at a real phenomenon through his or her eyes.

However, a multimedia device capable of processing the HDR video signal has not been popularized, and a so-called tone mapping process has been required to allow a general multimedia device to output the HDR video signal. In addition, today, the SDR video signal is used more generally than the HDR video signal, and a dynamic contrast algorithm is applied to improve performance of the SDR video signal. In this specification, the meaning of dynamic contrast has the same or similar meaning as the dynamic contrast algorithm.

According to the dynamic contrast algorithm, the part of a video signal which is at an intermediate level or higher is designed such that a curve thereof becomes higher than that of the original one to improve the brightness, and the remaining part, which is at a lower level, is designed such that a curve thereof becomes lower than that of the original one to improve a contrast ratio.

However, as the dynamic contrast algorithm is intensively applied, gradients become similar so that it is different to distinguish therebetween, and it may cause a problem of discoloration. In particular, when red/blue color is concentrated at the lower level, there occurs a problem of degrading the red/blue color because a curve at the lower level is designed to be lower than that of the original signal.

SUMMARY OF THE INVENTION

Accordingly, the object of the present invention is to solve the aforementioned problems. To this end, an embodiment of the present invention provides a method for improving performance of both HDR video signal processing and SDR video signal processing.

According to another embodiment of the present invention, provided is a multimedia device for processing a video signal, which is capable of simultaneously improving the brightness and contrast ratio while maintaining the original color, and control method thereof.

According to an embodiment of the present invention, provided is a multimedia device for processing a video signal, including: a storage unit, a receiving unit configured to receive a high dynamic range (HDR) video signal or a standard dynamic range (SDR) video signal; and a controller configured to perform tone mapping not only on the HDR video signal but also on the SDR video signal by referring to the storage unit. In this case, the controller may be configured to perform first tone mapping on the HDR video signal and perform second tone mapping on the SDR video signal, and the first tone mapping may be different from the second tone mapping.

For example, the controller may be configured to perform different tone curve mapping on each of the HDR video signal and the SDR video signal and apply different hue and saturation preserving algorithm to each of the HDR video signal and the SDR video signal.

For example, the controller may be further configured to perform a dynamic contrast function, and in the dynamic contrast function, a different curve may be applied based on a gradient region of each of the HDR video signal and the SDR video signal.

For example, the controller may be further configured to perform a local contrast function, and in the local contrast function, different curves may be applied based on an average picture level (APL) value of each of the HDR video signal and the SDR video signal.

For example, the first and second tone mapping may be performed in an RGB color space.

For example, when performing tone curve mapping on the SDR video signal, the controller may be configured to output a first gradient region and a third gradient region of an original signal as it is and apply a curve amplifying the original signal to a second gradient region. In this case, the first to third regions may not overlap with each other. In addition, the second gradient region may be a signal region higher than the first gradient region, and the third gradient region may be a signal region higher than the second gradient region.

For example, when performing the dynamic contrast function, the controller may be configured to output a fourth gradient region and a sixth gradient region of an original signal as it is and apply a curve amplifying the original signal to a fifth gradient region. In this case, the fourth to sixth regions may not overlap with each other. In addition, the fifth gradient region may be a signal region higher than the fourth gradient region, and the sixth gradient region may be a signal region higher than the fifth gradient region.

For example, when performing the local contrast function, the controller may be configured to: divide the HDR video signal or the SDR video signal into virtual blocks; calculate an APL value for each of the virtual blocks; and apply a linear curve to each of the virtual blocks based on the calculated APL value.

Accordingly, the present invention provides the following effects and/or advantages.

According an embodiment of the present invention, it is possible to improve the result obtained from SDR video signals by applying the tone mapping, which has been applied to only HDR video signals, to the SDR video signals without an additional device.

Further, according to another embodiment of the present invention, it is possible to improve not only the brightness of the HDR video signal but also that of the SDR video signal, thereby preventing gradient differentiation degradation and color discoloration.

BRIEF DESCRIPTION OF THE DRAWINGS

FIG. 10c is a table showing values of curves applied when the local contrast function is performed.

DETAILED DESCRIPTION OF THE INVENTION

Hereinafter, a description will be given in detail of embodiments disclosed herein with reference to the accompanying drawings. For the sake of brief description with reference to the drawings, the same or equivalent components may be provided with the same reference numbers regardless of drawing numbers, and description thereof will not be repeated. Suffixes such as "module", "unit" and the like in this disclosure may be used to refer to elements or components. Use of such a suffix herein is merely intended to facilitate description of the specification, and both suffixes may be interchangeably usable. In addition, if it is determined that the description of the known prior art obscures the gist of the embodiments disclosed in the present specification, the detailed description thereof will be omitted. Moreover, it should be understood that all changes, equivalents, and substitutes that do not depart from the spirit and technical scope of the present invention are encompassed in the present invention.

The description with ordinal numbers such as 'first ~', 'second ~' and the like is provided to facilitate the description of the corresponding terminologies only, which is non-limited by such terminologies or ordinal numbers. These terms are generally only used to distinguish one element from another.

It will be understood that when an element is referred to as being "connected with" or "accessed by" another element, the element can be directly connected with or accessed by the other element, or intervening elements may also be present. In contrast, when an element is referred to as being "directly connected with" or "directly accessed by" another element, there are no intervening elements present.

A singular representation may include a plural representation unless it represents a definitely different meaning from the context.

In this specification, it should be understood that terms such as "comprise", "include" or "have" are intended to indicate an existence of features, numbers, steps, operations, elements, items or any combination thereof disclosed in the specification, but the terms are not intended to exclude an existence of one or more other features, numbers, steps, operations, elements, or any combination thereof or possibility of adding those things.

Figure 1:
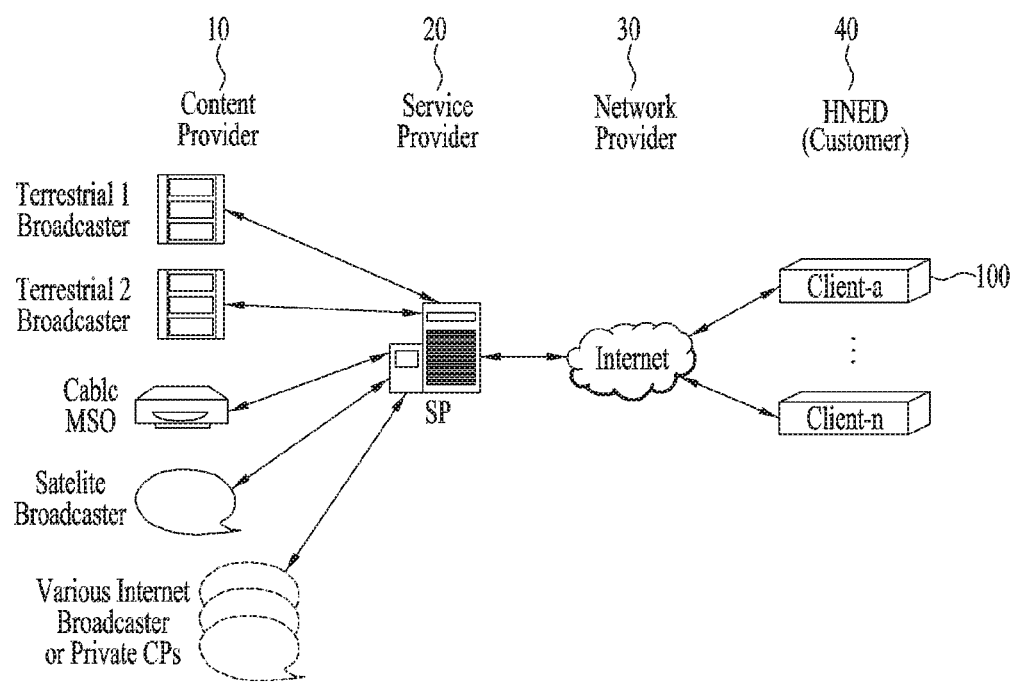
FIG. 1 is a schematic diagram for explaining a service system including a multimedia device according to an embodiment of the present invention.

FIG. 1 is a schematic diagram illustrating a service system including a multimedia device according to one embodiment of the present invention. Referring to FIG. 1, a service system may include a content provider (CP) 10, a service provider (SP) 20, a network provider (NP) 30, and a home network end device (HNED) (Customer) 40. The HNED 40 includes a client 100, that is, a multimedia device according to the present invention.

The CP 10 produces and provides various contents. Referring to FIG. 1, the CP 10 can include a terrestrial broadcaster, a cable system operator (SO), a multiple system operator (MSO), a satellite broadcaster, various Internet broadcasters, private content providers (CPs), etc. Meanwhile, the CP 10 can produce and provide various services, applications and the like as well as well as broadcast contents.

The SP 20 service-packetizes a content produced by the CP 10 and then provides it to the HNED 40. For instance, the SP 20 packetizes at least one of contents, which are produced by a first terrestrial broadcaster, a second terrestrial broadcaster, a cable MSO, a satellite broadcaster, various internet broadcasters, applications and the like, for a service and then provides it to the HNED 40.

The SP 20 can provide services to the client 100 in a uni-cast or multi-cast manner. Meanwhile, the SP 20 can collectively send data to a multitude of pre-registered clients 100. To this end, it is able to use IGMP (internet group management protocol) and the like.

The CP 10 and the SP 20 can be configured in the form of one entity. For example, the CP 10 can function as the SP 20 by producing a content, service-packetizing the produced content, and then providing it to the HNED 40, and vice versa.

The NP 30 provides a network environment for data exchange between the CP 10 and/or the SP 20 and the client 100.

The client 100 is a consumer belonging to the HNED 40. The client 100 may receive data by establishing a home network through the NP 30 for example and transmit/receive data for various services (e.g., VoD, streaming, etc.), applications and the like.

The CP 10 or/and the SP 20 in the service system may use a conditional access or content protection means for the protection of a transmitted content. Hence, the client 100 can use a processing means such as a cable card (CableCARD) (or POD (point of deployment) or a downloadable CAS (DCAS), which corresponds to the conditional access or the content protection.

In addition, the client 100 may use an interactive service through a network as well. In this case, the client 100 can directly serve as a content provider. And, the SP 20 may receive and transmit it to another client or the like.

In FIG. 1, the CP 10 or/and the SP 20 may be a service providing server that will be described later in the present specification. In this case, the server may mean that the NP 30 is owned or included if necessary. In the following description, despite not being specially mentioned, a service or a service data includes an internal service or application as well as a service or application received externally, and such a service or application may mean a service or application data FIG. 2 is a flow chart showing a multimedia device according to another embodiment of the present invention.

Figure 2:
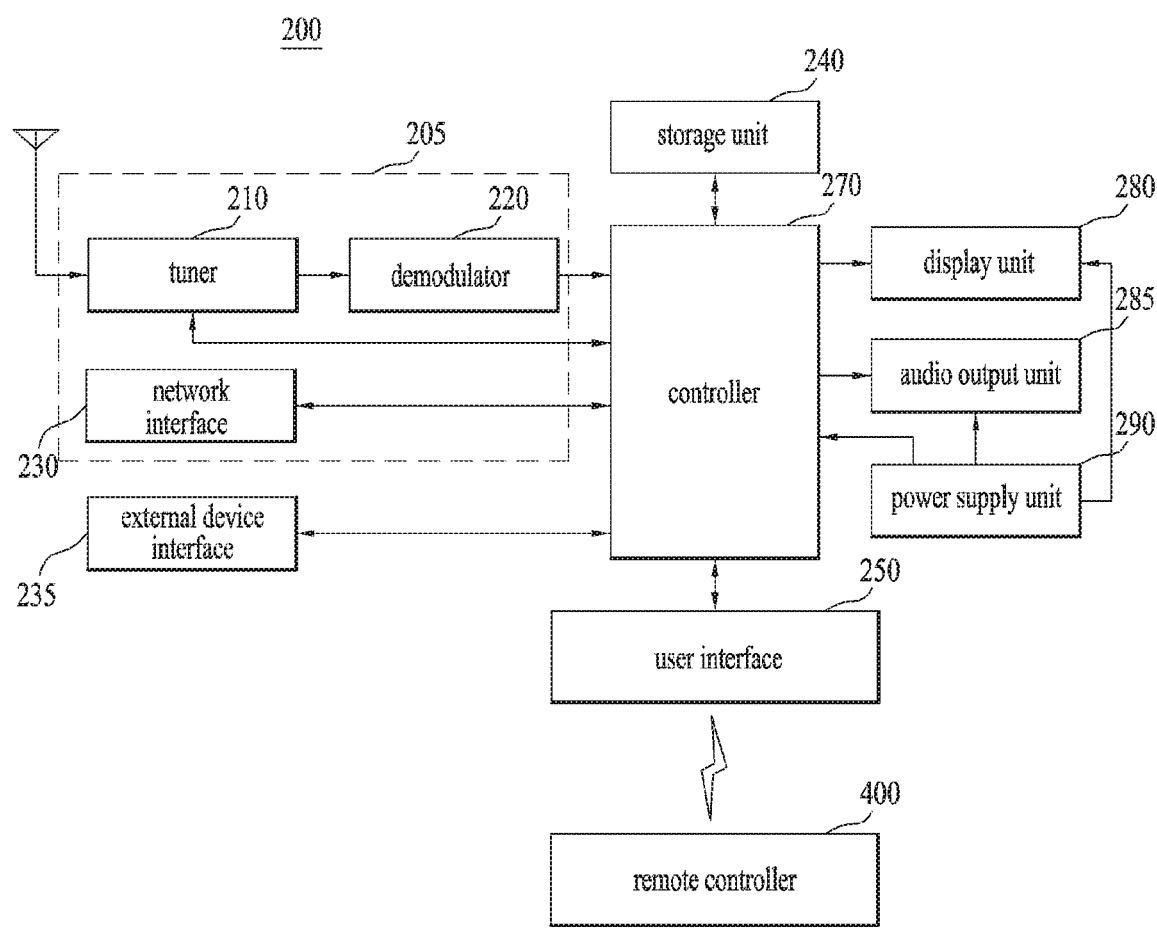
FIG. 2 is a flow chart for explaining a multimedia device according to an embodiment of the present invention.

Referring to FIG. 2, multimedia device 200 may include a broadcast receiving unit 205, an external device interface 235, a storage unit 240, a user input interface 250, a controller 270, a display unit 280, an audio output unit 285, a power supply unit 290, and a photographing unit (not shown). The broadcast receiving unit 205 may include at least one of one or more tuner 210, a demodulator 220, and a network interface 230. Yet, in some cases, the broadcast receiving unit 205 may include the tuner 210 and the demodulator 220 without the network interface 230, or may include the network interface 230 without the tuner 210 and the demodulator 220. The broadcast receiving unit 205 may include a multiplexer (not shown) to multiplex a signal, which is subjected to the tuner 210 and demodulated by the demodulator 220, and a signal received through the network interface 230. In addition, the broadcast receiving unit 205 can include a demultiplexer (not shown) and demultiplex a multiplexed signal, a demodulated signal, or a signal received through the network interface 230.

The tuner 210 may receive a radio frequency (RF) broadcast signal by tuning in to a channel selected by the user or all previously stored channels among RF broadcast signals received through an antenna. And, the tuner 210 converts the received RF broadcast signal into an IF (intermediate frequency) signal or a baseband signal.

For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 210 is able to process both of the digital broadcast signal and the analog signal. The analog baseband video/audio signal (CVBS/SIF) outputted from the tuner 210 may be directly inputted to the controller 270.

The tuner 210 may receive an RF broadcast signal of a single carrier or multiple carriers. The tuner 210 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal)

The demodulator 220 receives and demodulates the digital IF signal (DIF) converted by the tuner 210 and is then able to channel decoding and the like. To this end, the demodulator 220 may include a Trellis decoder, a de-interleaver, a Reed-Solomon decoder and the like, or may include a convolution decoder, a de-interleaver, a Reed-Solomon decoder and the like.

The demodulator 220 performs demodulation and channel decoding and is then able to output a stream signal TS. In this case, the stream signal may include a signal of multiplexing a video signal, an audio signal and/or a data signal. For instance, the stream signal may include MPEG-2TS (transport stream) in which a video signal of PMEG-2 and an audio signal of Dolby AC-3 are multiplexed.

The stream signal outputted from the demodulator 220 may be inputted to the controller 270. The controller 270 can control demultiplexing, audio/video signal processing, etc. Furthermore, the controller 270 can control outputs of video and audio through the display unit 280 and o the audio output unit 285, respectively.

The external device interface 235 may provide an interfacing environment between the multimedia device 200 and various external devices. To this end, the external device interface 235 may include an A/V input/output unit (not shown) or a wireless communication unit (not shown).

The external device interface 235 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 235 delivers a signal containing data such as an image, a video, an audio and the like, which is inputted through the connected external device, to the controller 270 of the multimedia device. The controller 270 may control a data signal of the processed image, video and audio and the like to be outputted to the connected external device. To this end, the external device interface 235 may further include an A/V input/output unit (not shown) or a wireless communication unit (not shown).

In order to input video and audio signals of an external device to the multimedia device 200, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The wireless communication unit can perform short-range wireless communication with another external device. The multimedia device 200 may be networked with other digital devices by communication protocols such as Bluetooth, radio frequency identification (RFID), infrared data association (IrDA), ultra wideband (UWB), ZigBee, and digital living network alliance (DLNA), etc. for example.

The external device interface 235 may perform input/output operations with a set-top box (STB) by being connected thereto through at least one of the aforementioned terminals.

Meanwhile, the external device interface 235 may receive an application or an application list within an adjacent external device and then forward it to the controller 270 or the storage unit 240.

The network interface 230 may provide an interface for connecting the multimedia device 200 to wired/wireless networks including Internet network. The network interface 230 may have Ethernet terminal and the like for an access to a wired network for example. For the access to the wireless network, the network interface 230 may use communication specifications such as WLAN (Wireless LAN) (Wi-Fi), Wibro (Wireless broadband), Wimax (World Interoperability for Microwave Access), HSDPA (High Speed Downlink Packet Access), etc.

The network interface 230 may transceive data with another user or another external device through the accessed network or another network linked to the accessed network. Particularly, the network interface 230 may send a portion of the content data stored in the multimedia device 200 to a user/external device selected from other users/digital devices previously registered at the digital device 200.

Meanwhile, the network interface 230 may access a prescribed webpage through the accessed network or another network linked to the accessed network. Namely, the network interface 430 accesses a prescribed webpage through a network and is then able to transceive data with a corresponding server. Besides, the network interface 430 can receive contents or data provided by a content provider or a network operator. Namely, the network interface 230 may receive contents (e.g., movie, advertisement, game, VOD, broadcast signal, etc.) provided by the content provider or a network provider and information associated with the contents through the network. The network interface 230 may receive update information and file of firmware provided by the network operator. And, the network interface 430 may send data to the internet or content provider or the network operator.

Moreover, the network interface 230 may select a desired application from open applications and receive it through a network.

The storage unit 240 may store programs for various signal processing and controls within the controller 270, and may also store a processed video, audio or data signal.

In addition, the storage unit 240 may execute a function of temporarily storing a video, audio or data signal inputted from the external device interface 235 or the network interface 230. The storage unit 240 may store information on a prescribed broadcast channel through a channel memory function.

The storage unit 240 may store an application or an application list inputted from the external device interface 235 or the network interface 230.

And, the storage unit 240 may store various platforms which will be described later.

The storage unit 240 may include storage media of one or more types, such as a flash memory type, a hard disk type, a multimedia card micro type, a card type memory (e.g. SD or XD memory), RAM, EEPROM, etc. The multimedia device 200 may play content files (a video file, a still image file, a music file, a text file, an application file, etc.) stored in the storage unit 240 and provide them to the user.

FIG. 2 illustrates an embodiment in which the storage unit 240 is separated from the controller 270, by which the present invention is non-limited. In other words, the storage unit 240 may be included in the controller 270.

The user input interface 250 may forward a signal inputted by a user to the controller 270 or forward a signal outputted from the controller 270 to the user.

For example, the user input interface 250 may receive control signals for power on/off, channel selection, screen settings and the like from a remote controller 400, or transmit control signals of the controller 270 to the remote controller 400, according to various communication schemes such as RF communication, IR communication, and the like.

The user input interface 250 can forward control signals inputted through a power key, a channel key, a volume key, and a local key (not shown) for a setup value or the like to the controller 270.

The user input interface 250 may forward a control signal inputted from a sensing unit (not shown) sensing a gesture of a user to the controller 270 or transmit a signal of the controller 270 to the sensing unit (not shown). Here, the sensing unit (not shown) may include a touch sensor, a voice sensor, a location sensor, an action sensor, etc.

The controller 270 may generate and output a signal for a video or audio output by demultiplexing a stream inputted through the tuner 210, the demodulator 220 or the external device interface 235 or processing demultiplexed signals.

A video signal processed by the controller 270 can be inputted to the display unit 280 and displayed as an image corresponding to the video signal. In addition, the video signal video-processed by the controller 270 can be inputted to an external output device through the external device interface 235.

An audio signal processed by the controller 270 can be audio-outputted to the audio output unit 285. Moreover, the audio signal processed by the controller 270 can be inputted to the external output device through the external device interface 235.

The controller 270 may include a demultiplexer, an image processor, and the like, which are not shown in FIG. 2.

The controller 270 can control the overall operations of the multimedia device 200. For example, the controller 270 can control the tuner 210 to tune in to an RF broadcast corresponding to a channel selected by a user or a previously stored channel.

The controller 270 can control the multimedia device 200 according to a user command input through the user input interface 250 or an internal program. Particularly, the controller 270 can control the multimedia device 200 to access a network to download an application or an application list desired by a user to the multimedia device 200.

For example, the controller 270 may control the tuner 210 to receive a signal of a channel selected in response to a prescribed channel selection command received through the user input interface 250. And, the controller 270 may process a video, audio or data signal of the selected channel. The controller 270 may control information on a channel selected by the user to be outputted together with a processed video or audio signal through the display unit 280 or the audio output unit 285.

For another example, the controller 270 may control a video signal or an audio signal, which is inputted through the external device interface unit 235 from an external device (e.g., a camera or a camcorder), to be outputted through the display unit 280 or the audio output unit 285 in response to an external device image play command received through the user input interface 250.

Meanwhile, the controller 270 can control the display unit 280 to display a video. For example, the controller 270 can control a broadcast video inputted through the tuner 210, an external input video inputted through the external device interface 235, a video inputted through the network interface 230, or a video stored in the storage unit 240 to be displayed on the display unit 280. Here, the video displayed on the display unit 280 may include a still image or moving images or may include a 2D or 3D video.

The controller 270 may control a content to be played. Here, the content may include a content stored in the multimedia device 200, a received broadcast content, or a content inputted externally. The content may include at least one of a broadcast video, an external input video, an audio file, a still image, an accessed web screen, and a document file.

The controller 270 may control an application or an application list, which is located in the multimedia device 200 or downloadable from an external network, to be displayed when an application view menu is entered.

The controller 270 may control installation and execution of applications downloaded from an external network together with various user interfaces. Moreover, the controller 270 can control a video related to a launched application to be displayed on the display unit 280 by a user's selection.

Meanwhile, a channel browsing processor (not shown) configured to generate a thumbnail image corresponding to a channel signal or an external input signal may be further included.

The channel browsing processor may receive an input of a stream signal (TS) outputted from the demodulator 220 or an input of a stream signal outputted from the external device interface 235, extract a video from the inputted stream signal, and then generate a thumbnail image. The generated thumbnail image can be directly inputted to the controller 270 or may be inputted to the controller 270 by being encoded. Moreover, the generated thumbnail image may be encoded into a stream and then inputted to the controller 270. The controller 270 may display a thumbnail list including a plurality of thumbnail images on the display unit 280 using the inputted thumbnail images. The thumbnail images included in the thumbnail list can be updated sequentially or simultaneously. Accordingly, the user can conveniently check content of a plurality of broadcast channels.

The display unit 280 may convert each of a video signal, a data signal, and an OSD signal processed by the controller 270 or each of a video signal and a data signal received from the external device interface 235 into R, G and B signals to generate a drive signals.

The display unit 280 may include a PDP, an LCD, an OLED, a flexible display, a 3D display, or the like.

The display unit 280 may be configured as a touchscreen and used as an input device as well as an output device.

The audio output unit 285 receives a signal audio-processed by the controller 270, for example, a stereo signal, a 3.1 channel signal or a 5.1 channel signal, and then outputs the received signal as audio. The audio output unit 285 may be configured as one of speakers of various types.

Meanwhile, the multimedia device 200 may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 270 through the user input interface 250.

The multimedia device 200 may further include a photographing unit (not shown) for photographing a user. Image information acquired by the photographing unit (not shown) can be inputted to the controller 270.

The controller 270 may sense a gesture of a user from an image captured by the photographing unit (not shown) or a signal sensed by the sensing unit (not shown), or by combining the image and the signal.

The power supply unit 290 may supply a corresponding power to the multimedia device 200 overall.

Particularly, the power supply unit 290 can supply the power to the controller 270 configurable as a system-on-chip (SoC), the display unit 280 for a video display, and the audio output unit 285 for an audio output.

To this end, the power supply unit 290 may include a converter (not shown) configured to convert an AC power to a DC power. Meanwhile, for example, if the display unit 280 is configured as an LCD panel having a multitude of backlight lamps, the power supply unit 290 may further include an inverter (not shown) capable of PWM (pulse width modulation) operation for luminance variation or dimming drive.

The remote controller 400 sends a user input to the user input interface 250. To this end, the remote controller 400 can use Bluetooth, RF communication, IR communication, UWB, ZigBee, etc.

In addition, the remote controller 400 can receive audio, video or data signal outputted from the user input interface 250 and then display the received signal or output the same as audio or vibration.

The above-described multimedia device 200 may include a digital broadcast receiver capable of processing digital broadcast signals of ATSC or DVB of a stationary or mobile type.

Regarding the multimedia device according to the present invention, some of the illustrated components may be omitted or new components (not shown) may be further added as required. On the other hand, the multimedia device may not include the tuner and the demodulator, differently from the aforementioned multimedia device, and may play a content by receiving the content through the network interface or the external device interface.

Figure 3:
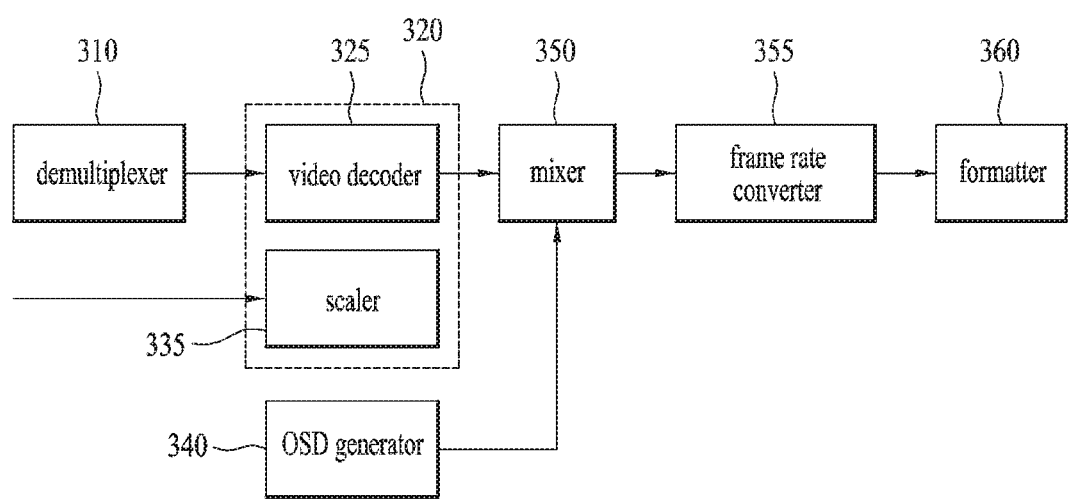
FIG. 3 is a flow chart for explaining the detailed configuration of each of the controller of FIG. 2 according to an embodiment of the present invention.

FIG. 3 is a flow chart showing the detailed configuration of the controller of FIG. 2 according to one embodiment of the present invention.

One example of the controller may include a demultiplexer 310, a video processor 320, an OSD generator 340, a mixer 350, a frame rate converter (FRC) 355, and a formatter 360. Besides, the controller may further include an audio processor and a data processor (not shown).

The demultiplexer 310 demultiplexes an inputted stream. For instance, the demultiplexer 310 can demultiplex an inputted stream signal into an MPEG-2 TS video, audio and data signals. Herein, the stream signal inputted to the demultiplexer may include a stream signal outputted from the tuner, demodulator or external device interface.

The video processor 320 performs a video processing of the demultiplexed video signal. To this end, the video processor 320 may include a video decoder 325 and a scaler 335.

The video decoder 325 can decode the demultiplexed video signal, and the scaler 335 can scale the resolution of the decoded video signal to be outputtable from the display.

The video decoder 325 can support various specifications. For instance, the video decoder 325 performs a function of MPEG-2 decoder if a video signal is encoded by MPEG-2. And, the video decoder 335 performs a function of H.264 decoder if a video signal is encoded by DMB (digital multimedia broadcasting) or H.264.

Meanwhile, the video signal decoded by the image processor 320 is inputted to the mixer 350.

The OSD generator 340 may generate OSD data according to a user input or by itself. For example, the OSD generator 340 may generate data to be displayed on the screen of the display 280 in the graphic or text form on the basis of a control signal of a user input interface. The generated OSD data may include various data such as a user interface screen of the digital device, various menu screens, widgets, icons, viewing rate information and the like. The OSD generator 340 can generate data to display a caption of a broadcast video or EPG based broadcast information.

The mixer 350 mixes the OSD data generated by the OSD generator 340 and the video signal processed by the video processor 320. The mixer 350 then provides the mixed signal to the formatter 360. By mixing the decoded video signal and the OSD data, OSD is displayed in a manner of overlaying a broadcast video or an external input video.

The frame rate converter (FRC) 355 may convert a frame rate of an inputted video. For example, the frame rate converter 355 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 355 can perform the conversion by inserting a first frame between the first frame and a second frame or inserting a third frame predicted from the first and second frames. For another instance, in case of converting a frame rate into 240 Hz from 60 Hz, the frame rate converter 355 can perform the conversion by further inserting three same or predicted frames between the existing frames. Meanwhile, in case of not performing a separate frame conversion, the frame rate converter 355 may be bypassed.

The formatter 360 may change the output of the frame rate converter 355, which is inputted thereto, to fit an output format of the display unit. For example, the formatter 360 can output an RGB data signal. In this case, this RGB data signal can be outputted as low voltage differential signal (LVDS) or mini-LVDS. If an inputted output of the frame rate converter 355 is a 3D video signal, the formatter 360 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal.

And, the audio processor (not shown) in the controller can process bass, treble, volume adjustment and the like.

A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described multimedia device is one example according to the present invention. And, at least one of the components may be integrated, added or omitted depending on options of an actually embodied multimedia device. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention.

Meanwhile, a multimedia device may include an image signal processing device configured to process a signal of an image saved in the corresponding device or a signal of an inputted image. Examples of the image signal processing device may include a settop box (STB) failing to include the display unit 280 and the audio output unit 285 shown in FIG. 2, the aforementioned DVD player, a Blu-ray player, a game device, a computer and the like.

Figure 4:
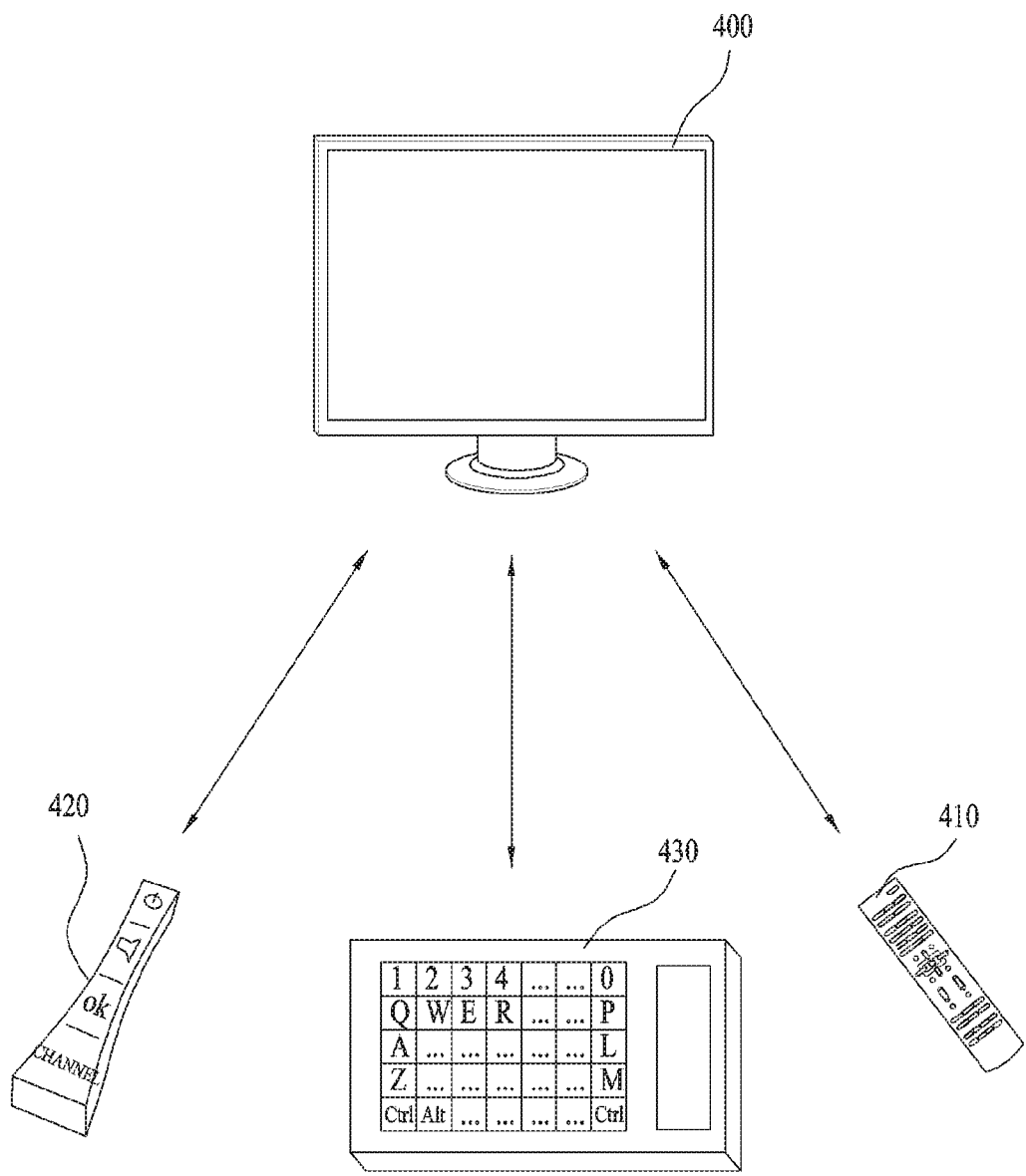
FIG. 4 is a diagram illustrating an input unit connected to each of the multimedia device of FIG. 2 according to an embodiment of the present invention.

FIG. 4 is a diagram of an input means connected to the multimedia device shown in FIG. 2 according to one embodiment of the present invention.

In order to control a multimedia device 200, a front panel (not shown in the drawing) or a control means (e.g., an input means) installed in the digital device 200 is used.

Meanwhile, as a user interface device (UID) capable of a wire/wireless communication, the control means includes a remote controller 410, a key board 430, a pointing device 420, a touchpad, or the like, mainly embodied for the purpose of controlling the multimedia device 200. And, a control means dedicated to an external input by being connected to the multimedia device 200 may be included as well. Besides, the control means may further include a mobile device (e.g., a smartphone, a tablet PC, etc.) capable of controlling the multimedia device 200 through a mode switching or the like despite not having the purpose of controlling the multimedia device 200. For clarity, a pointing device is taken as one example for the description in the present specification, by which the present invention is non-limited.

The input means can communicate with the multimedia device by employing at least one of communication protocols as necessary. In this case, the communication protocols may include Bluetooth, RFID (Radio Frequency Identification), IrDA (infrared Data Association), UWB (Ultra Wideband), ZigBee, DLNA (Digital Living Network Alliance), RS and the like.

The remote controller 410 is a general input means provided with various key buttons required for controlling the multimedia device 200.

The pointing device 420 provided with a gyro sensor and the like delivers a prescribed control command to the multimedia device 200 by embodying a corresponding pointer on a screen of the multimedia device 200 based on a user's motion, a pressure, a rotation and the like. The pointing device 420 may be called one of various names such as a magic remote controller, a magic controller and the like.

As the multimedia device 200 is an intelligence integrated digital device capable of providing various services such as a web browser, an application, an SNS (social network service) and the like as well as broadcasts, it is difficult to control the multimedia device 200 using a conventional remote controller 410. Hence, the keyboard 630 is embodied into a configuration similar to a PC keyboard to facilitate inputs of text and the like by complementing the control difficulty.

Meanwhile, the control means such as the remote controller 410, the pointing device 420, the keyboard 430, or the like is provided with a touchpad as necessary and is usable for the various control purposes of facilitating text inputs, pointer shifts, zoom-in/out of photo or video, and the like.

Hereinafter, the embodiments of the present invention for processing video signals including HDR and SDR video signals will be described in detail with reference to FIGS. 5 to 11. The description, which will be made with reference to FIGS. 5 to 11, could be supplementarily interpreted without departing from the scope of the appended claims and their equivalents.

In this specification, it is assumed that at least one of the above-described content provider 10, service provider 20, and network provider 30 provides a content including an HDR or SDR image. The dynamic range is the concept of including a contrast ratio and may indicate how a difference between two colors in an image can be represented as naturally as in reality. In this case, the image may include a video image, moving image, still image, panorama image, graphic image, etc. In addition, for example, the HDR may mean a dynamic range where the contrast ratio is equal to or higher than 103:1, which is measured in nits corresponding to a unit of brightness. Moreover, for example, the SDR means a dynamic range where the contrast ratio is equal to or lower than 100:1, which is measured in nits.

Figure 5:
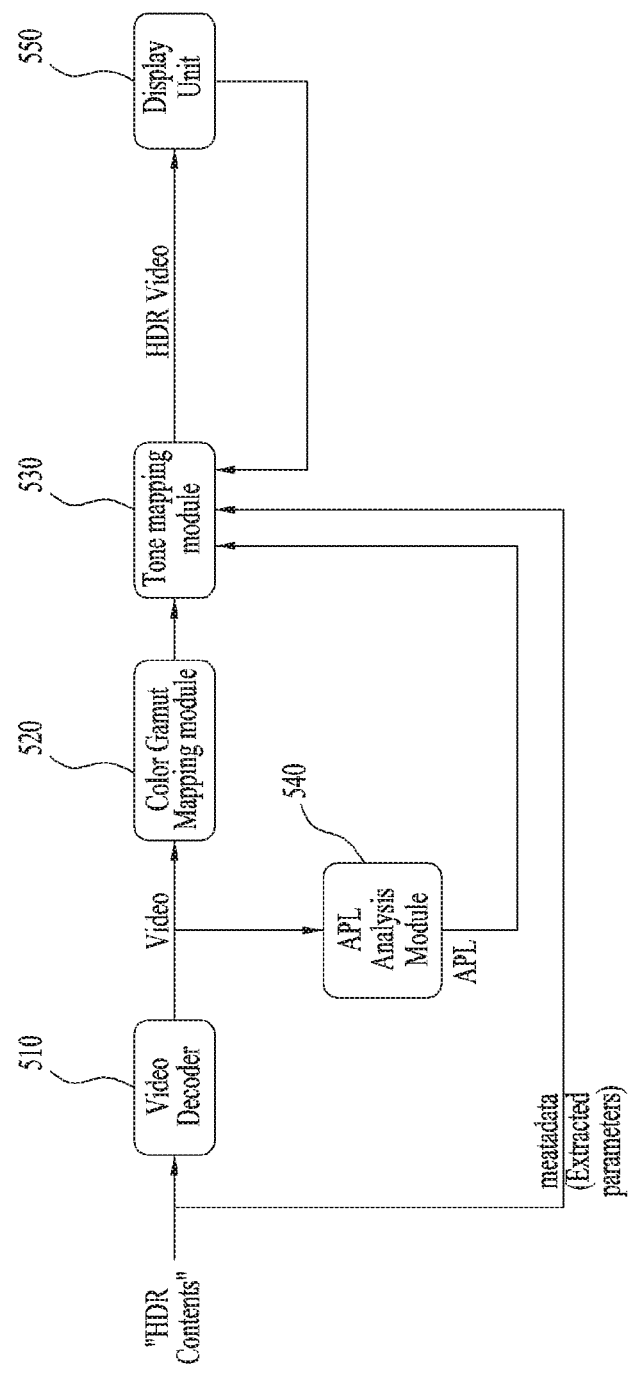
FIG. 5 is a flow chart illustrating operation of main components of the multimedia device performing tone mapping according to an embodiment of the present invention.

FIG. 5 is a flow chart illustrating a process performed by the multimedia device according to an embodiment of the present invention for processing HDR contents upon receiving the HDR contents.

The multimedia device 200 may include the video decoder 510, a color gamut mapping module 520, a tone mapping module 530, an APL (average picture level) analysis module 540, and a display unit 550. In some embodiments, the video decoder 510, the color gamut mapping module 520, the tone mapping module 530, and the APL analysis module 540 may be implemented inside the controller 270 of FIG. 2, and the display unit 550 may be implemented as the display unit 280 of FIG. 2. The functions of the aforementioned modules can be performed based on data or algorithms stored in a memory without departing from the scope of the appended claims and their equivalents.

When an HDR image or meta data thereof is received from an external server, the image may be inputted to the video decoder 510, and the meta data of the HDR image may be inputted to the tone mapping module 530.

The video decoder 510 may decode the image and then output the decoded image to the color gamut mapping module 520. In addition, the video decoder 510 may output pixel data of the decoded image to the APL analysis module 540, and the APL analysis module 540 may obtain an APL of the image based on the pixel data of the decoded image. As described above, the APL analysis module 540 may obtain the APL of the image every predetermined time or frame or obtain an APL per block of the image every predetermined time or frame. Moreover, the APL analysis module 540 may output the obtained APL of the image to the tone mapping module 530.

Meanwhile, the color gamut mapping module 520 may map a color gamut included in the decoded image to color regions that can be displayed by the display unit 550 and then output the result to the tone mapping module 530.

The tone mapping module 530 may perform tone mapping of the image based on the APL of the image inputted from the APL analysis module 540 and the meta data of the received image.

Thereafter, the tone mapping module 530 may output the tone-mapped image to the display unit 550, and the display unit 550 may display an image having the HDR feature reconstructed therein.

Figure 6:
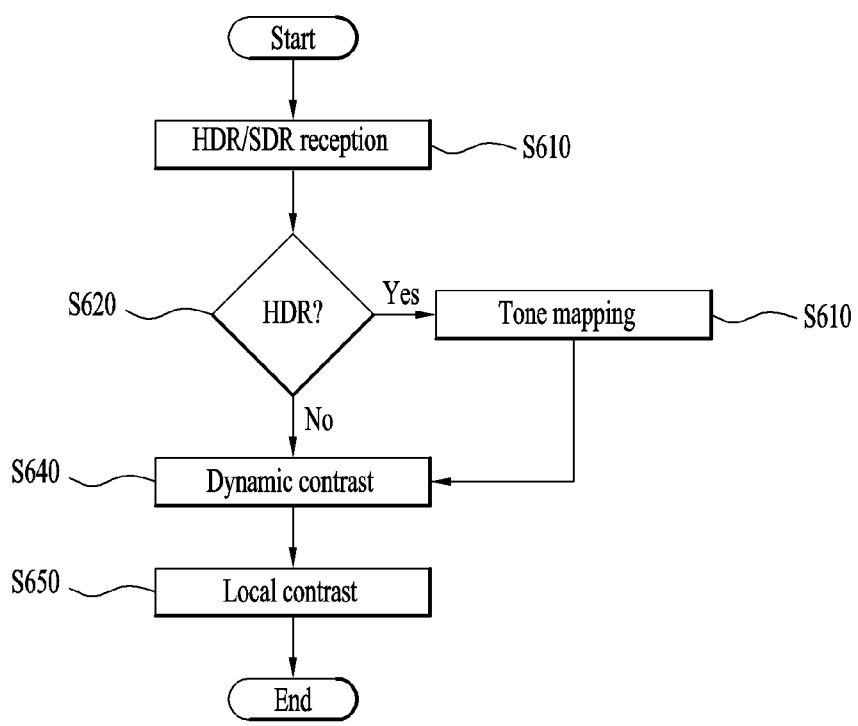
FIG. 6 is a flow chart for explaining the conventional process for processing an HDR or SDR video signal upon receiving the signal.

FIG. 6 is a flow chart illustrating a process performed by the conventional multimedia device for processing an HDR or SDR video signal upon receiving the signal.

For example, when receiving an HDR video signal, the conventional multimedia device performs tone mapping. On the contrary, upon receiving an SDR video signal, the multimedia device does not perform tone mapping.

In other words, when receiving an HDR or SDR video signal [S610], the conventional multimedia device determines whether the received video signal is either the HDR video signal or SDR video signal [S620]. When it is determined that the received video signal is the HDR video signal, the conventional multimedia device performs the tone mapping [S630]. On the contrary, when the received signal is the SDR video signal, the conventional multimedia device performs does not perform the tone mapping. Thereafter, the conventional multimedia device applies a dynamic contrast function to the either the HDR or SDR video signal [S640] and then performs a local contrast function [S650].

That is, to improve the brightness and contrast ratio, although the dynamic contrast function and local contrast function are applied to both the HDR and SDR video signals, they are different from each other in that in the case of HDR contents, the dynamic contrast function and local contrast function are applied after applying the tone mapping but in the case of SDR contents, the dynamic contrast function and local contrast function are applied without applying the tone mapping.

However, when the dynamic contrast function and local contrast function are applied to the SDR video signal with a low dynamic range for the purpose of improving the contrast ratio and brightness thereof, there occur a problem of gradient differentiation degradation and color discoloration.

Hence, in an embodiment of the present invention, proposed is a method for improving the contrast ratio and brightness of an SDR video signal while maintaining the original color thereof by applying tone mapping to not only an HDR video signal but also the SDR video signal and then performing the dynamic contrast function and local contrast function upon reception of the SDR video signal. In particular, different tone mapping schemes are designed for HDR and SDR video signals in order to retain gradient differentiation and prevent color discoloration.

Figure 7:
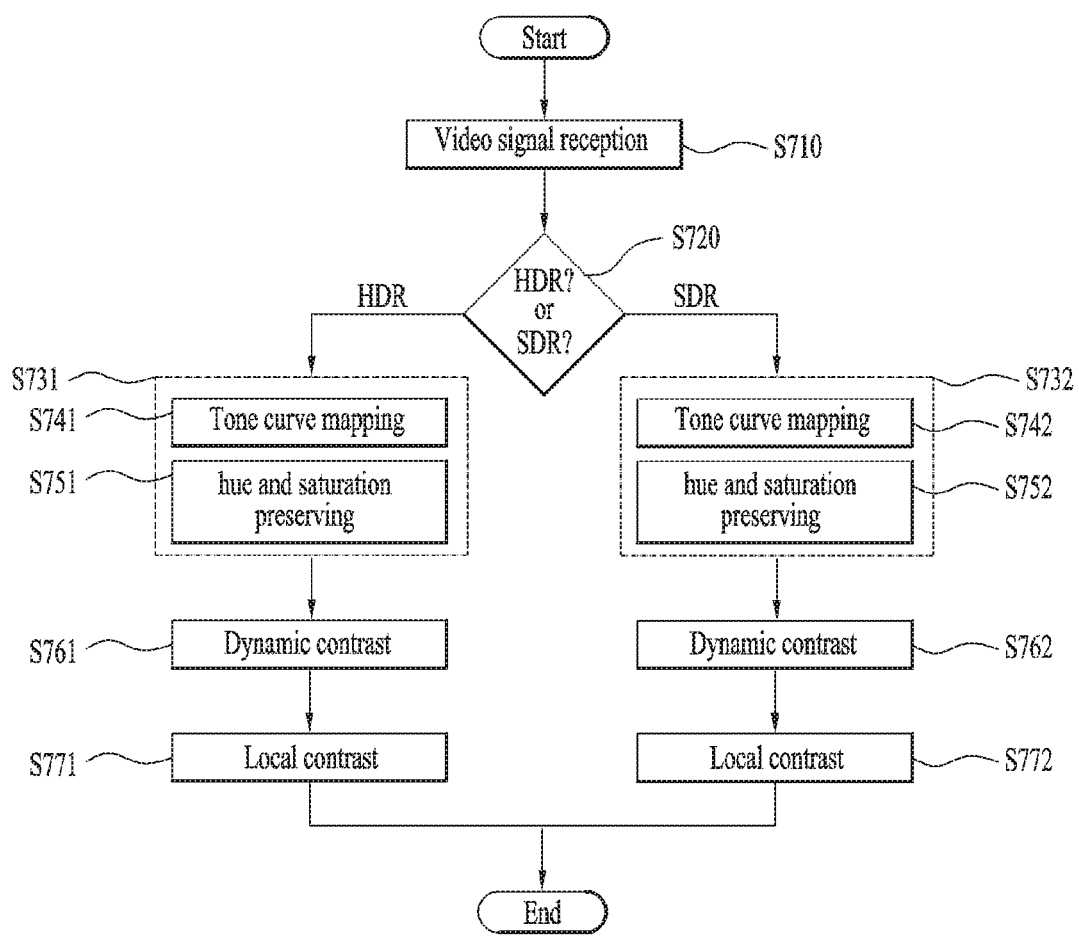
FIG. 7 is a flow chart for explaining a process for processing an HDR or SDR video signal upon receiving the signal according to an embodiment of the present invention.

FIG. 7 is a flow chart illustrating a process performed by the multimedia device according to an embodiment of the present invention for processing an HDR or SDR video signal upon receiving the signal.

First, when receiving a video signal [S710], the multimedia device according to an embodiment of the present invention determines whether the received video signal is either an HDR video signal or an SDR video signal [S720]. When the received signal is the HDR video signal, the multimedia device performs first tone mapping [S731], performs tone curve mapping [S741], performs hue and saturation preserving algorithm [S751], performs the dynamic contrast function [S761], and then performs the local contrast function [S771]. In addition, according to an embodiment of the present invention, when the received signal is the SDR video signal, the multimedia device performs second tone mapping [S732], performs the tone curve mapping [S742], performs hue and saturation preserving algorithm [S752], performs the dynamic contrast function [S762], and then performs the local contrast function [S772]. Performing the first tone mapping [S731] includes performing the tone curve mapping [S741] and performs hue and saturation preserving algorithm [S751], and performing the second tone mapping [S732] includes performing the tone curve mapping [S742] and performs hue and saturation preserving algorithm [S752].

The multimedia device according to an embodiment of the present invention applies the tone mapping to not only the HDR video signal but the SDR video signal. Although the tone mapping scheme applied to the HDR video signal is different from that applied to the SDR video signal, since they can be implemented on the same chip, the present invention has economic advantages in that it can be implemented without additional costs.

Each steps depicted in FIG. 7 will be explained in detail with reference to FIGS. 8 to 10. For example, the steps of performing the tone mapping shown in FIG. 7 [S731 and S732] will be described with reference to FIG. 8, the steps of performing the dynamic contrast function shown in FIG. 7 [S761 and S762] will be described with reference to FIG. 9, and the steps of performing the local contrast function shown in FIG. 7 [S771 and S772] will be described with reference to FIG. 10.

Figure 8:
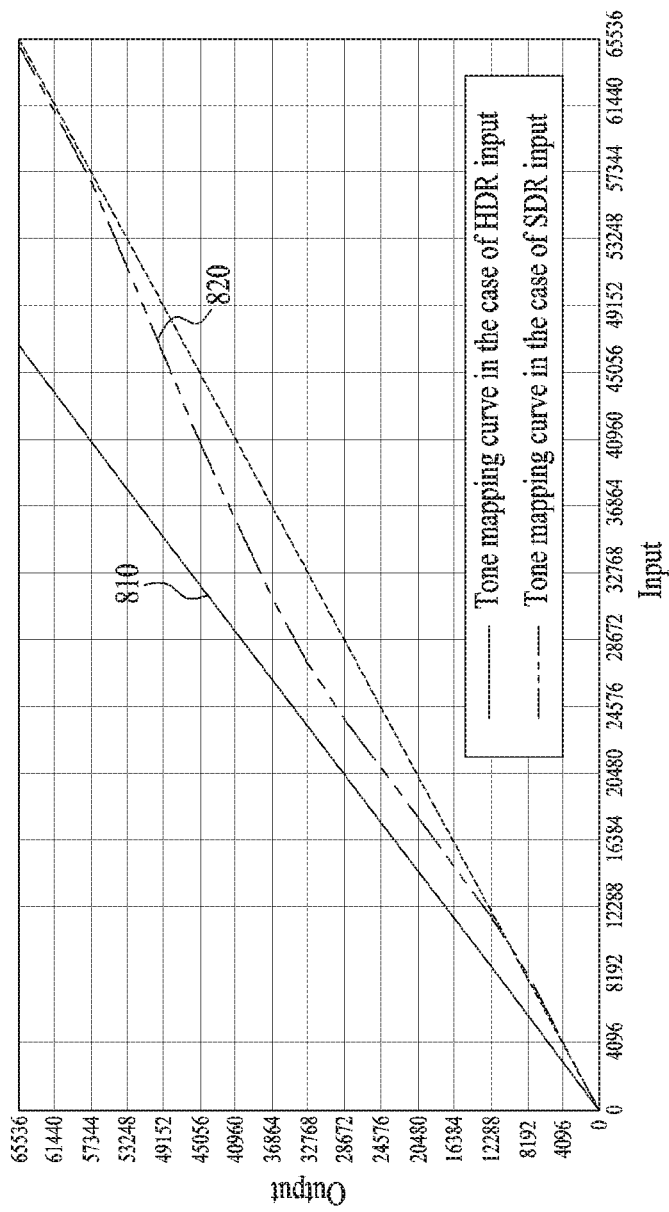
FIG. 8 is a graph illustrating comparison of curves applied to HDR and SDR video signals when tone mapping is applied according to an embodiment of the present invention.

FIG. 8 is a graph illustrating a curve 810 applied to the HDR video signal and a curve 820 applied to the SDR video signal in the tone curve mapping steps [S741 and S742].

Referring to the curve 810 applied to the HDR video signal, since the HDR video signal is generally concentrated in a low-gradient region, the curve 810 applied to the HDR video signal is formed in a straight line to constantly amplify the low-gradient region of an original signal.

On the other hand, referring to the curve 820 applied to the SDR video signal, a portion including a low-gradient region (first gradient region) and a high-gradient region (third gradient region) of the curve 820 is formed in a straight line, and the remaining portion corresponding to an intermediate-gradient region (second gradient region) is amplified. Unlike the HDR video signal, the SDR video signal is not concentrated in the low-gradient region. Thus, if the curve 810 for the HDR video signal is applied to the SDR video signal, the gradient differentiation in a light region is degraded because the signal is concentrated in the high-gradient region. Therefore, in the case of the SDR video signal, the low-gradient and high-gradient regions are not amplified, and the curve 820 is applied to amply the intermediate-gradient region. By doing so, it is possible improve the overall brightness while maintain the gradient differentiation of the original signal.

The experiment results show that when a start point of the low-gradient region, where there was no control of the signal, was set to 0% and an end point thereof was set to from 10% to 20%, the brightness was improved while the color was maintained.

The experiment results show that when a start point of the high-gradient region, where there was no control of the signal, was set to from 80% to 90% and an end point thereof was set to 100%, the brightness was improved while the color was maintained.

The experiment results show that when the video signal was amplified up to 1.2 times in the intermediate-gradient region where the signal was controlled, the brightness was improved while the color was maintained. However, the 1.2 times amplification is merely an example, and the maximum amplification may vary depending on received signals.

The experiment results show that hue and saturation of an RGB color space was maintained better than other color spaces even though its brightness was improved due to the signal amplification in that RGB color space. Hence, it is desirable that the tone mapping step is performed in the RGB color space.

However, when the tone curve mapping is performed [S741 and S742], if the signal is amplified, its hue and saturation is not equal to that of the original signal. Thus, after the tone curve mapping is performed, hue and saturation preserving algorithm is performed [S751 and S752] in order to adjust the color change that occurs during the tone curve mapping step.

Figure 9A:
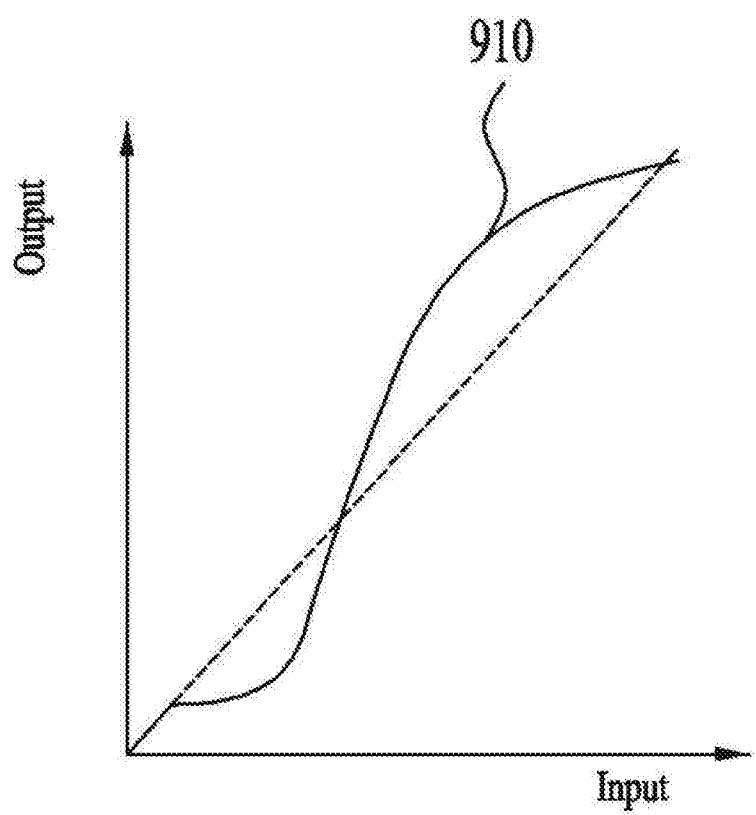
FIGS. 9a and 9b are graphs illustrating a curve applied when the dynamic contrast function defined in the prior art is performed and a curve applied when the dynamic contrast function in accordance with an embodiment of the present invention is performed.
Figure 9B:
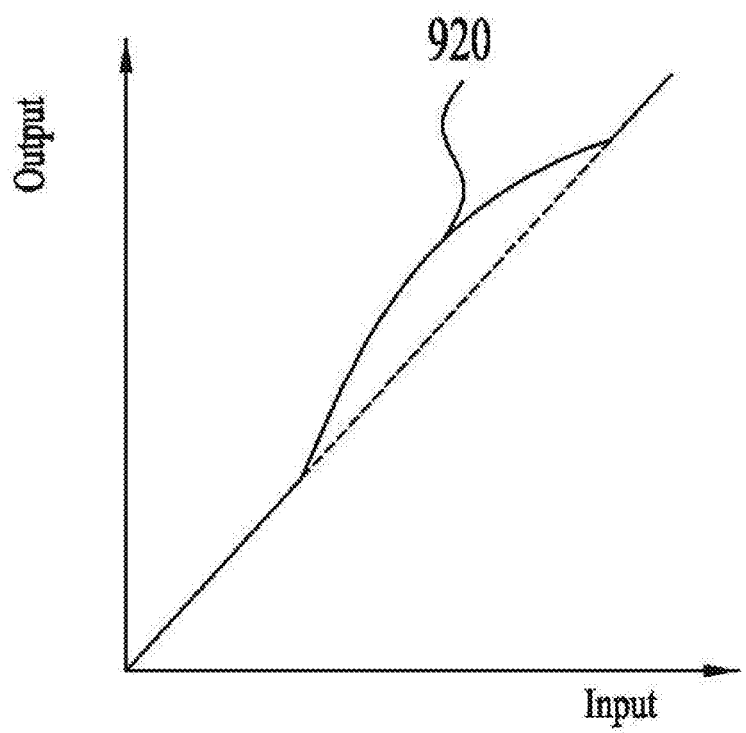

FIGS. 9a and 9b are diagrams illustrating a curve applied when the conventional dynamic contrast function is performed and a curve applied when the dynamic contrast function of the multimedia device in accordance with an embodiment of the present invention is performed [S761 and S762].

FIG. 9a shows the curve 910 applied when the conventional dynamic contrast function is performed. In the prior art, the S-shaped curve 910 that darkens the low-gradient region corresponding to a dark region and brightens the high-gradient region corresponding to a bright region is applied to the video signal to increase the contrast ratio. When the S-shaped curve 910 is applied to the video signal, the contrast ratio can be increased, but in the case of a bright or dark image, the degraded gradient differentiation may be problematic.

Therefore, as shown in FIG. 9b, when the signal is amplified only in an intermediate-gradient region (fifth gradient region) without adjusting it in a low-gradient region (fourth gradient region) and a high-gradient region (sixth gradient region), it is possible to improve the brightness while maintaining the contrast ratio and retaining the gradient differentiation in the low-gradient and high-gradient region.

In general, a signal with red or blue color is concentrated in the low-gradient region. In the prior art, since the signal in the low-gradient region is reduced to improve the contrast ratio, there is a problem that the red or blue color is dimmed. However, according to the present invention, it is not necessary to reduce the signal in the low-gradient region, thereby maintain the red or blue color as it is.

The experiment results show that when a start point of the low-gradient region, where there was no control of the signal, was set to 0% and an end point thereof was set to from 15% to 30%, the brightness was improved while the color was maintained.

The experiment results show that when a start point of the high-gradient region, where there was no control of the signal, was set to from 80% to 90% and an end point thereof was set to 100%, the brightness was improved while the color was maintained.

The experiment results show that when the brightness was improved only through the tone mapping or dynamic contrast function, there was a limitation in improving the brightness due to the color discoloration.

However, the multimedia device according to an embodiment of the present invention can increase the brightness during the tone mapping and further increase it while performing the dynamic contrast function in order to maintain the color and improve the brightness.

In addition, considering that the tone mapping increases the brightness in the RGB color space, the dynamic contrast function may cause a noise when the dynamic contrast function is performed in the RGB color space. Thus, it is desirable that the dynamic contrast function is performed in a color space for brightness such as YUV, YCbCr, or YPbPr.

As described above, since a color space for the tone mapping is different from that for the dynamic contrast function, the low-gradient region (first gradient region), intermediate-gradient region (second gradient region), and high-gradient region (third gradient region) for the tone mapping are different from the low-gradient region (fourth gradient region), intermediate-gradient region (fifth gradient region), and high-gradient region (sixth gradient region) for the dynamic contrast function, respectively, and the curves applied thereto are also different from each other.

In the YUV color space, Y indicates luminance representing brightness, and UV indicates chrominance Although the RGB value can be calculated from the YUV value, there are various formulas since RGB does not correspond to YUB one-to-one. One example of the formulas is as follows.

$$Y = 0.299 \times R + 0.587 \times G + 0.114 \times B$$

$$U = (B - Y) \times 0.492$$

$$V = (R - Y) \times 0.877$$

Figure 10A:
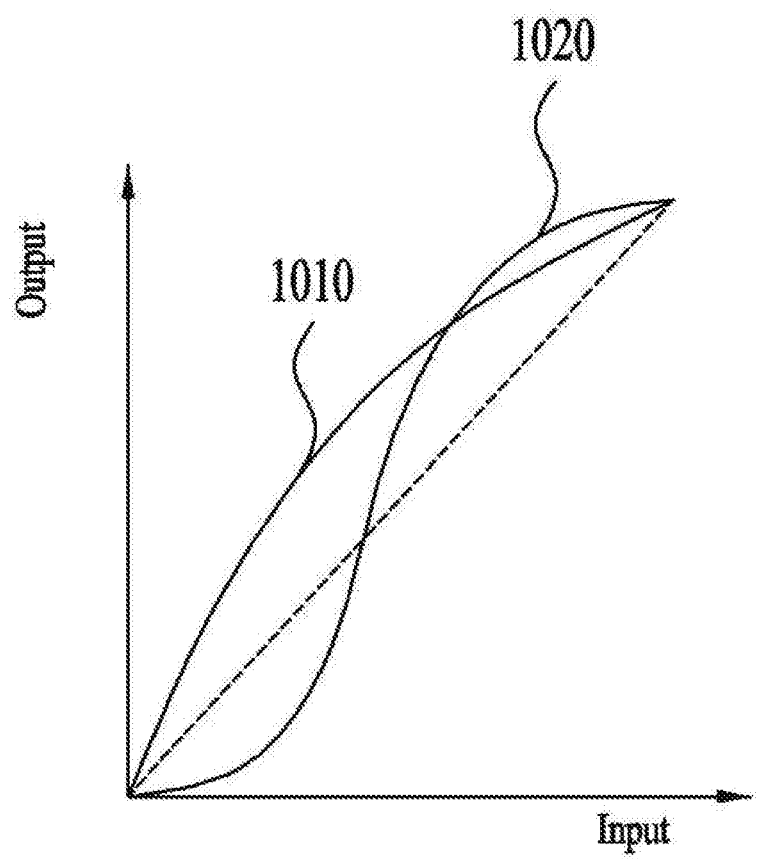
FIGS. 10a and 10b are graphs illustrating curves applied when the local contrast function defined in the prior art is performed and curves applied when the local contrast function in accordance with an embodiment of the present invention is performed.
Figure 10B:
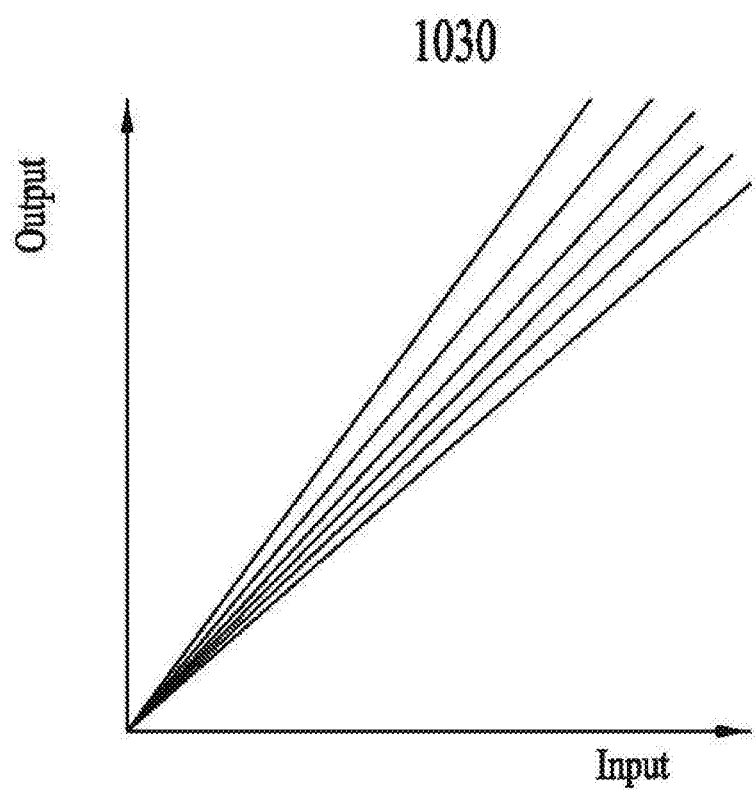

FIGS. 10a and 10b are diagrams illustrating a curve applied when the conventional local contrast function is performed and curves applied when the local contrast function of the multimedia device in accordance with an embodiment of the present invention is performed [S771 and S772].

FIG. 10a shows the curves 1010 and 1020 applied when the conventional local contrast function is performed. According to the prior art, if a bright or dark region occurs after performing the dynamic contrast function, the curve is intuitively adjusted in the corresponding region. However, when the curve is intuitively adjusted, the amount of the curve adjustment varies individually, and there also occurs a problem of irregular gradient.

Therefore, when performing the local contrast function [S771 and S772], the multimedia device according to an embodiment of the present invention divides an area to be displayed into virtual blocks and then calculates an average picture level (APL) of each block. Thereafter, the multimedia device applies a linear curve 1030 to each block based on the APL value of each block Unlike in the prior art, since the linear curve is applied based on an APL value, adjustment can be performed in an objective manner. In addition, since the applied curve is linear, the signal is uniformly distributed instead of being concentrated in a specific region. Thus, it is possible to improve the gradient differentiation and prevent the brightness from being decreased. Moreover, the overall contrast ratio can also be improved by applying a linear curve with a low slope in the region where the APL value is low and applying a linear curve with a high slope in the region where the APL value is high.

From the experiment results, it can be seen that linear curves needs to be divided into six levels for efficient calculation and use of the memory. A relevant example is illustrated in FIG. 10c, and values of individual linear curves can be changed according to a received video signal or if necessary.

Figure 11A:
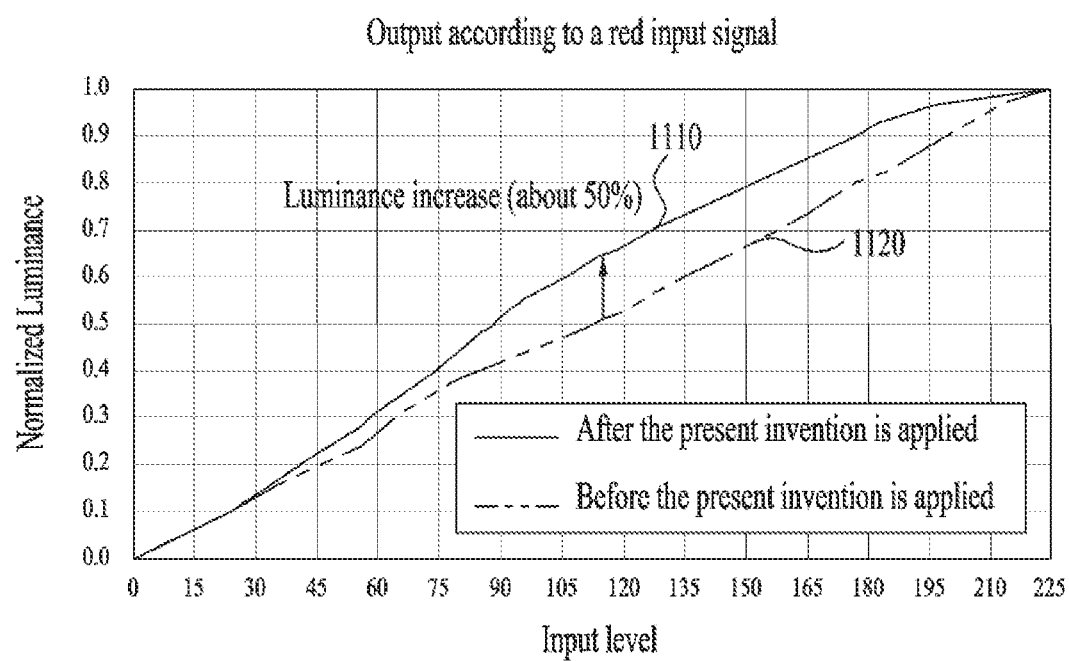
FIGS. 11a and 11b are graphs illustrating an output effect according to a red input signal and an output effect according to a blue input signal.
Figure 11B:
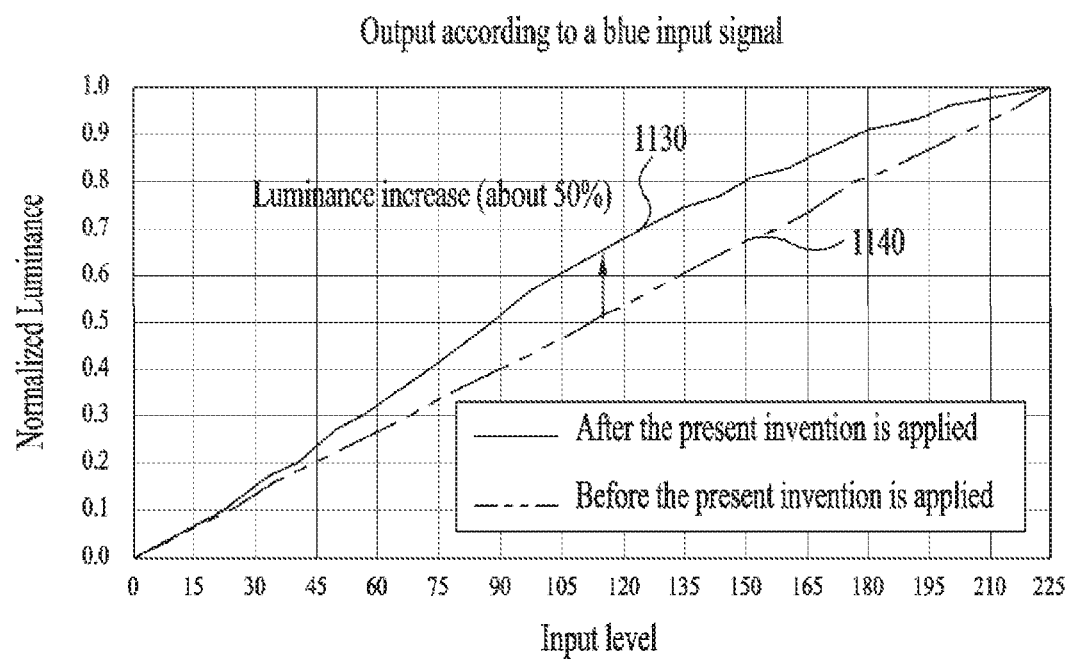

FIGS. 11a and 11b are graphs illustrating an output effect according to a red input signal and an output effect according to a blue input signal. The graphs illustrated in FIGS. 11a and 11b are the results according to an embodiment of the present invention, and the experiment results shows that luminance was increased up to about 60% and the average increase was about 50%.

FIG. 11a shows normalized luminance of an output signal in accordance with the red input signal. In addition, it can be seen from a graph 1110 that compared to an original signal 1120, the luminance is improved after applying an embodiment of the present invention.

FIG. 11b shows normalized luminance of an output signal in accordance with the blue input signal. In addition, it can be seen from a graph 1130 that compared to an original signal 1140, the luminance is improved after applying an embodiment of the present invention.

The above-described invention can be implemented in a program-recorded medium as computer-readable codes. The computer-readable media may include all kinds of recording devices in which data readable by a computer system are stored. The computer-readable media may include HDD (hard disk drive), SSD (solid state disk), SDD (silicon disk drive), ROM, RAM, CD-ROM, magnetic tapes, floppy disks, optical data storage devices, and the like, for example and also include carrier-wave type implementations (e.g., transmission via Internet). Further, the computer may include a terminal control unit. Therefore, the above-mentioned embodiments are to be construed in all aspects as illustrative and not restrictive. The scope of the present invention should be determined by reasonable interpretation of the appended claims. In addition, the present invention covers the modifications and variations of this invention that come within the scope of the appended claims and their equivalents.

What is claimed is:

1. A multimedia device for processing a video signal, the multimedia device comprising:
    a memory;
    a receiving unit configured to receive a video signal; and
    a controller configured to:
    perform, by referring to the memory, a first tone mapping on the received video signal by applying a first linear curve to the received video signal based on a determination that the received video signal corresponds to a high dynamic range (HDR) video signal;
    perform, by referring to the memory, a second tone mapping on the received video signal by
    applying a non-linear curve amplifying a second gradient of the received video signal and applying a second linear curve to a first gradient region and a third gradient region of the received video signal based on a determination that the received video signal corresponds to a standard dynamic range (SDR) video signal, wherein the non-linear curve is different from the first linear curve and the second linear curve, wherein the second gradient region is a signal region higher than the first gradient region, and the third gradient region is a signal region higher than the second gradient region and the first gradient region, the second gradient region, and the third gradient region do not overlap with each other; and
    perform a dynamic contrast function on the second tone mapped received SDR video signal based on the determination that the received video signal corresponds to the SDR video signal by applying different curves based on a gradient region of each of the first tone mapped HDR received video signal and the second tone mapped SDR received video signal, wherein the first tone mapping and the second tone mapping are performed in a first color space and the dynamic contrast function is performed in a second color space that is different from the first color space; and
    perform the dynamic contrast function on the first tone mapped HDR received video signal based on the determination that the received video signal corresponds to the HDR video signal.

2. The multimedia device of claim 1, wherein the controller is configured to:
    perform different hue and saturation preserving on each of the HDR video signal and the SDR video signal.

3. The multimedia device of claim 1, wherein the controller is further configured to perform a local contrast function, and wherein in the local contrast function, different curves are applied based on an average picture level (APL) value of each of the HDR video signal and the SDR video signal.

4. The multimedia device of claim 3, wherein performing the local contrast function, comprises:
    divide the HDR video signal or the SDR video signal into virtual blocks;
    calculate an APL value for each of the virtual blocks; and
    apply a linear curve to each of the virtual blocks based on the calculated APL value.

5. The multimedia device of claim 1, wherein the color space for the first tone mapping and the second tone mapping is an RGB color space.

6. The multimedia device of claim 1, wherein performing the dynamic contrast function, comprises:
    output a fourth gradient region and a sixth gradient region of an original signal as it is; and apply a curve amplifying the original signal to a fifth gradient region,
wherein the fourth to sixth regions do not overlap with each other, and
wherein the fifth gradient region is a signal region higher than the fourth gradient region, and the sixth gradient region is a signal region higher than the fifth gradient region.

7. A method performed by a multimedia device for processing a video signal, the method comprising:
receiving a video signal;
performing a first tone mapping on the received video signal by applying a first linear curve to the received video signal based on a determination that the received video signal corresponds to a high dynamic range (HDR) video signal;
performing a second tone mapping on the received video signal by applying a non-linear curve amplifying a second gradient region of the received video signal and applying a second linear curve to a first gradient region and a third gradient region of the received video signal based on a determination that the received video signal corresponds to a standard dynamic range (SDR) video signal, wherein the non-linear curve is different from the first linear curve and the second linear curve, wherein the second gradient region is a signal region higher than the first gradient region, and the third gradient region is a signal region higher than the second gradient region and the first gradient region, the second gradient region, and the third gradient region do not overlap with each other;
performing a dynamic contrast function on the second tone mapped received SDR video signal based on the determination that the received video signal corresponds to the SDR video signal by applying different curves based on a gradient region of each of the first tone mapped HDR received video signal and the second tone mapped SDR received video signal, wherein the first tone mapping and the second tone mapping are performed in a first color space and the dynamic contrast function is performed in a second color space that is different from the first color space; and
performing the dynamic contrast function on the first tone mapped HDR received video signal based on the determination that the received video signal corresponds to the HDR video signal.

8. The method of claim 7, wherein different hue and saturation preserving is performed in each of the first and second tone mapping.

9. The method of claim 7, further comprising performing a local contrast function, and wherein in the local contrast function, different curves are applied based on an average picture level (APL) value of each of the HDR video signal and the SDR video signal.

10. The method of claim 9, wherein performing the local contrast function further comprises:
dividing the HDR video signal or the SDR video signal into virtual blocks;
calculating an APL value for each of the virtual blocks; and
applying a linear curve to each of the virtual blocks based on the calculated APL value.

11. The method of claim 7, wherein the color space for the first tone mapping and the second tone mapping is an RGB color space.

12. The method of claim 7, wherein performing the dynamic contrast function comprises:
outputting a fourth gradient region and a sixth gradient region of an original signal as it is; and
applying a curve amplifying the original signal to a fifth gradient region,
wherein the fourth to sixth regions do not overlap with each other, and
wherein the fifth gradient region is a signal region higher than the fourth gradient region, and the sixth gradient region is a signal region higher than the fifth gradient region.

* * * * *